W. K. LEWIS AND W. GREEN.
DISTILLATION PROCESS.
APPLICATION FILED MAY 17, 1917. RENEWED MAR. 22, 1920.
1,437,980.
Patented Dec. 5, 1922.
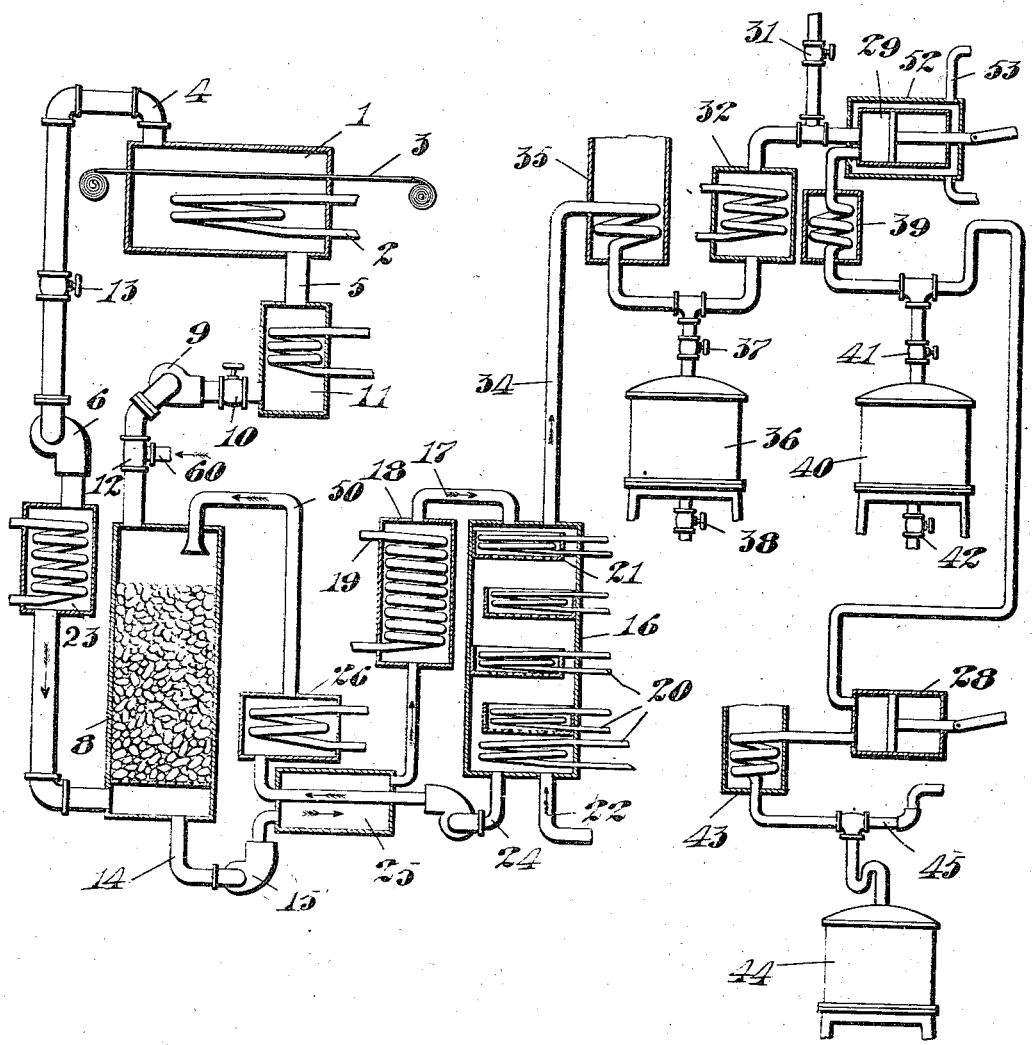

Patented Dec. 5, 1922.

1,437,980

UNITED STATES PATENT OFFICE.

WARREN K. LEWIS AND WILLIAM GREEN, OF NEWTON, MASSACHUSETTS.

DISTILLATION PROCESS.

Application filed May 17, 1917, Serial No. 169,321. Renewed March 22, 1920. Serial No. 367,826.

*To all whom it may concern:*

Be it known that we, WARREN K. LEWIS and WILLIAM GREEN, citizens of the United States, residing at Newton, in the county of Middlesex and State of Massachusetts, have invented certain Improvements in Distillation Processes, of which the following description, in connection with the accompanying drawings, is a specification, like reference characters on the drawings indicating like parts in the several figures.

This invention relates to improvements in distillation processes and particularly to those (1) where it is important that the distillates be very pure and that the residue contain a minimum amount of the distillate, or (2) where, due to the low vapor pressures dealt with, means must be adopted to increase in the proper direction the difference in vapor pressure either between the liquors treated in the still and the gas or vapors in contact with them or between the vapors in the condenser or absorber and the liquid into which these vapors are being condensed or absorbed.

It is well known to those skilled in the separation and purification of liquids by distillation that great difficulties are encountered when it is desired to make a clean cut separation. This difficulty increases when (a) the vapor pressures of the pure liquids are nearly equal, (b) the liquids are miscible, (c) the boiling points of liquid to be vaporized are, under the conditions imposed, low or (d) the pressure of the vapor to be condensed is low due to the presence of other vapors or gases.

Any one of these four conditions is a source of difficulty and, if unmitigated, would alone make a process commercially impracticable. While the art has now so progressed that when any one condition adverse to economical operation is encountered, the difficulties may be in a measure overcome, a combination of these conditions has in many arts made the process of distillation of such liquids economically impossible. A case of extremely adverse conditions and a very marked example of continued failure, in spite of much effort is found in the art of recovery of solvents used in the manufacture of rubberized fabrics, artificial leather, or the like.

For purposes of illustration, let us consider the case of the recovery of solvents used in making coating material for fabrics and let us assume that the solvent to be recovered is benzol. A consideration of the problem of such recovery shows that it is a most difficult distillation process. Because the condition "(c) the boiling points of the liquids to be vaporized are, under the conditions imposed, low", exists, due to the fact that the temperature cannot be raised without injuring the coated goods and because other components in the coating mixture are miscible with the benzol, the partial pressure of the benzol vapor must be lowered by mixture with other vapors and gases. Air is the diluent which has been employed in the past. If air and benzol vapor did not produce an explosive mixture, the problem would be much simplified, but because of this condition it has been heretofore considered necessary to add a quantity of air enormously in excess of that actually needed in the drying process as such, in order so to dilute the benzol vapors that the mixture will not be explosive. When the vapors have been so diluted "(d) the pressure of the vapor to be condensed is" so "low due to the pressure of other vapors" that recovery of the solvent as liquid in a condenser is economically an impossibility.

In accordance with one feature of the present invention it is proposed to use as a diluent flue gases, from which the smoke and soot have been washed. The use of washed or cleaned flue gas is desirable for commercial reasons and has not been practised prior to our invention. In that washed flue gases do not support combustion, the concentration of benzol can thus be increased with perfect safety. By this means the benzol could be recovered in a condenser if the temperature at which the fabric is dried could be made comparatively high. Where the temperature must be low (and this condition is almost universal) it is proposed to use, not a condenser, but an absorber to recover the benzol vapor from the mixture of washed flue gases and benzol vapor. Such a step involves the absorption of the benzol vapor in a miscible liquid (in this case we would use a heavy, high boiling point creosote oil or petroleum fraction) and the separation of the mixture of benzol and absorbent liquid into the original liquids so nearly pure that they may be used again in the process.

As we have explained, the use of an inert gas as a diluent permits a high concentration of benzol with entire safety. Accordingly an important advantage resulting from this characteristic step of our method is that a high benzol concentration is also secured in the oil mixture by the absorption step of the process. Such a condition is for obvious reasons of great importance in improving the efficiency of the distillation and reducing its cost.

Another advantage derived from the use of an inert gas as a diluent is that it reduces oxidation and consequent gumming and deterioration of the absorbent oil. Choking of the entire oil system, including the stills, is thereby largely eliminated.

In another of its aspects the present invention relates to improvements in the steps of separating the benzol and absorbent liquid. As is known by those skilled in the art, the benzol used in making coating compounds must be very pure and as will be seen in the following description the absorbent must be benzol free in order to admit of high benzol recovery. Therefore the separation must be complete. The process herein disclosed not only very completely separates the benzol from the absorbent but does it much more cheaply than has been done in the past.

Before describing these steps of the very novel method in detail, let us consider the general factors involved. It is well known that in the case of any process the rate at which it goes is fixed by the difference of condition between the acting substance and the substance acted upon. Therefore the degree to which such processes are economical is fixed by the degree to which differences of condition may be increased in the case of substances upon which it is desired to act, and decreased in the case of substances upon which no action is desired. One of the best resources for producing a difference tending toward economical operation is the counter flow and in the case of distillation the dephlegmating column is one of the most effective applications of the counter flow principle. Two other means of increasing an effective difference in the process of vaporization are well known, viz. the use of vacuum and the use of injected steam. All of these increase the difference between the vapor pressure of the liquid in the still and the pressure of the liquid's vaporized components in contact with the liquid, while the ease with which steam may, by condensation, be removed from the vapor mixture, tends toward more ready condensation of the other vapors.

In distillation processes in which these three have been used, it has been considered impossible to maintain a high vacuum below the dephlegmating column due to the resistance through the column. Further, the maintenance of the vacuum in any part of the system is difficult if it is attempted to obtain a vacuum in which the total pressure is lower than that of the vapor pressure of water at the temperature of the cooling water available. Since a great saving of steam (the cost of which is a very large item in the cost of the separation of the benzol and the absorbent) is effected if a dephlegmating column can be used and if at the same time high vacuum maintained throughout the still, the present invention contemplates, as novel steps of the method, improvements in the manner of using dephlegmating columns and improvements in vacuum pumps and their operation.

For purposes of illustration the process of our invention will be described as applied to the recovery of gasoline or benzol, but it will be understood that its application is not so limited and that other liquids, such for example as glycerine, may be successfully recovered or purified by employing certain of the steps herein disclosed.

The accompanying drawings illustrate diagrammatically one form of apparatus which may be used in carrying out our method.

The drying chamber 1 is provided with openings for the passage of the fabric 3 which is freshly coated with a solution of rubber in benzol or gasoline. The chamber 1 is heated by a steam coil 2 and the benzol or gasoline vapor is taken up by warm flue gas admitted to the bottom of the chamber through a pipe 5. The gas thus formed in the chamber 1 is drawn out from the top of the chamber through a pipe 4 by a fan 6 and forced through a cooler 23 into the bottom of a scrubber or rubble tower 8. The gas passes upwardly through the tower 8 meeting a counter flow of a heavy hydrocarbon oil which acts to absorb or dissolve from the gas a very large proportion of the gasoline or benzol contained. The gas passes out from the top of the tower 8 through a pipe 12 and is forced by a fan 9 through a preheater 11 and into the drying chamber 1.

It will be observed that the gas follows a continuous system, taking up the benzol or gasoline vapor in the drying chamber 1 and shedding it during its passage of the tower 8. Make-up gas to maintain proper inert gas concentration may be admitted to the system through the pipe 60 or, if desired, the gas may be discharged after leaving the tower 8 and fresh flue gas supplied continuously through the pipe 60. We have found it desirable to maintain the drying chamber approximately at atmospheric pressure and this regulation may be brought about by means of dampers 10 and 13 in the supply and exhaust pipe respectively.

The oil used to absorb the gasoline or benzol in the tower 8 may be any suitable heavy hydrocarbon oil. It is supplied to the top of the tower through a pipe 50 terminating in a sprinkler head, after having been cooled by passing through a cooler 26. The oil passing downwardly through the tower 8, is finally drawn off with its gasoline content through a pipe 14. It is then forced by a pump 15 through a heat interchanger 25 where it is somewhat warmed, then through a foreheater 18 and finally through a pipe 17 into the top of the still 16.

During its passage downwardly through the still the gasoline is vaporized and the oil which reaches the bottom of the still is drawn off through the pipe 24 and pumped back through the heat interchanger 25 and the cooler 26 to the tower 8. It will thus be seen that the oil used in these steps of our process is also moved in a closed system, absorbing gasoline in the tower 8 and losing it in the still 16.

The still 16 contains a series of pans 21 leaving a free space alternately between the opposite still walls and being perforated so that the mixture delivered by the pipe 17 shall fall from one pan to the next. The still and each of the pans may be heated by steam coils 20. Live steam may be also admitted to the bottom of the still through a pipe 22.

As the mixture of oil and gasoline passes downwardly through the still it is progressively heated and the gasoline distilled off, the gasoline vapor being drawn upwardly through the pipe 34 by vacuum pumps 29 and 28 which will be referred to below.

As will be apparent from the foregoing description, the distillation step of our method takes place in a counter flow manner and with or without injection of steam. A third characteristic of this step is that it is carried out under a substantial and uniform degree of vacuum. For the separation of any heavy oil the steam and gasoline or benzol vapor are led through the pipe 34 to a condenser 35 where any vapor of the heavy oil which may have been vaporized will be condensed and may be drawn off into a tank 36 by proper manipulation of valves 37 and 38.

The gasoline or benzol vapor may be then heated by passing through a heater 32. A predetermined amount of dry air or other non-condensible gas may be allowed to mix with the vapors on their way to the pump 29. The admixture of air lowers the saturation of the resulting mixture. If the pump is operated at a temperature sufficiently high, the otherwise condensible vapors can not condense under the action of the pump. Accordingly the pump 29 is provided with a steam jacket 52 and maintained at a temperature sufficiently high to prevent condensation. We have found, by properly regulating the preheating of the vapors at 32, the admission of air at 31 and the temperature of the pump, that vacuum can be maintained at a degree higher than has been thought commercially practicable heretofore. It will be noted that the pans 21 are so arranged in the still 16 as to afford a free passage for the vapors and consequently the entire still is maintained under uniform vacuum.

Upon leaving the pump 29 the vapor is passed through a condenser 39 where most of the steam and the benzol or gasoline are condensed and may be drawn off from a tank 40 by manipulating the valves 41 and 42, the benzol or gasoline being separated from the condensed steam by gravity.

The gasoline or benzol vapor not condensed by the condenser 39 will be pumped by a rough vacuum pump 28 into a condenser 43. Any vapor not condensed at this stage of the process is exhausted to the air through the pipe 45 while the condensed benzol or gasoline is collected in the tank 44. The term distillation is used herein to designate the evaporation of liquids from mixture under any conditions whatever, with or without recovery by condensation, and includes drying, where any volatile liquid is concerned.

We have herein disclosed our invention as including the steps of dissolving the organic solvent to be recovered in a suitable menstruum and then distilling the solvent from the menstruum. However, our copending application Serial No. 258,521, filed Oct. 17, 1918, discloses the invention in a broader aspect and contains generic claims not limited in the respect just noted.

Having thus described our invention, what we claim is:

1. The process of recovering organic solvents in drying systems, which consists in passing washed flue gas over the material to be dried, securing a high concentration of the organic solvent in the washed flue gas, removing the organic solvent from the washed flue gas by dissolving it in a suitable menstruum, thus producing a high concentration of the solvent in the menstruum, and then distilling out the solvent.

2. The process of recovering benzol from freshly coated rubberized fabric, which consists in passing washed flue gas over the fabric, counter flowing the benzol saturated gas and a heavy oil to dissolve the benzol in the oil, and distilling out the benzol from the oil mixture.

3. The process of recovering benzol from rubberized material, which consists in passing a washed non-oxidizing flue gas over said material to take up the benzol, dissolving the benzol in a heavy oil substantially without oxidation of the oil, and finally distilling the unoxidized mixture to remove the benzol.

4. The distillation process of recovering a liquid organic solvent from a material carrying it which consists in passing cleaned flue gas over said material within an enclosure from which the surrounding air is substantially excluded to cause said cleaned flue gas to take up said solvent in a vaporized condition, removing the organic solvent from the cleaned flue gas by dissolving it in suitable menstruum, and then distilling out the organic solvent.

In testimony whereof we have signed our names to this specification.

WARREN K. LEWIS.
WILLIAM GREEN.